United States Patent Office

3,401,185
Patented Sept. 10, 1968

3,401,185
METAL SALTS OF PHOSPHORUS ACIDS AND PROCESS
Norman A. Meinhardt, Lyndhurst, Ohio, assignor to The Lubrizol Corporation, Wickliffe, Ohio, a corporation of Ohio
No Drawing. Continuation-in-part of application Ser. No. 468,965, July 1, 1965. This application June 16, 1967, Ser. No. 646,482
18 Claims. (Cl. 260—429.9)

---

ABSTRACT OF THE DISCLOSURE

An improved process for preparing metal salts of organic phosphinic and phosphonic acids and their thio analogs is described. The improvement consists of contacting the acid and the metal base in the presence of a catalytic amount of a carboxylic acid or salt thereof. The metal salts produced in this manner exhibit greater heat and oxidation stability. These salts are useful as additives for lubricants and fuels, as insecticides, pesticides, ore-flotation agents, plasticizers, and the like.

---

This is a continuation-in-part application of Ser. No. 468,965, filed July 1, 1965, now U.S. Patent 3,347,790.

This invention relates to metal salts of organic phosphorus acids and to a process for preparing the same.

Metal salts of phosphorus acids such as phosphorothioic acids, phosphinic acids, and phosphonic acids find use in many applications. They are especially useful as additives in hydrocarbon compositions, plastics, resins, paints, lubricants, fuels, greases, etc. In most applications, an important consideration of the utility of such metal salts is their resistance to degradation due to heat or oxidation. A great deal of effort has been devoted to the preparation of such metal salts having improved thermal and oxidative stability.

Another consideration which relates to the commercial usefulness of such metal salts is the convenience and cost of the processes by which they are produced. Thus, it is desirable to have processes which are capable of producing such metal salts in high yields and which can be carried out under convenient process conditions.

It is, accordingly, an object of this invention to provide improved metal salts of phosphorus acids.

Another object of this invention is to prepare metal salts of phosphorus acids which have enhanced resistance to thermal and oxidative degradation.

Another object of this invention is to prepare basic metal salts of phosphorus acids.

Another object of this invention is to provide an improved process for preparing metal salts of phosphorus acids.

These and other objects are accomplished by providing an improvement in the process for preparing metal salts of phosphorus acids comprising the reaction of a Group II metal base with a phosphorus acid of the structural formula

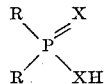

wherein one R is selected from the class consisting of hydrocarbon, hydrocarbon-oxy, and XH radicals and the other R is a hydrocarbon radical and X is selected from the class consisting of oxygen and sulfur, the improvement comprising carrying out the process in the presence of a catalyst selected from the class consisting of carboxylic acids having up to 10 aliphatic carbon atoms and salts thereof with a metal selected from the class consisting of Group I metals, Group II metals, aluminum, iron, nickel, cobalt, and copper.

The improved process of this invention is especially useful in preparing metal salts of phosphinothioic acids and phosphonothioic acids. These acids are represented, respectively by the above formula wherein (1) both R radicals are hydrocarbon or (2) one is hydrocarbon and the other is a hydrocarbon-oxy or —XH radical. The hydrocarbon group of these radicals can contain up to about 200 carbon atoms and can be an alkyl, aryl, aralkyl, alkenyl, or cycloalkyl radical. These hydrocarbon groups may contain one or more polar substituents such as ether, halo, nitro, and the like. Such polar substituents usually account for no more than about 10% by weight of the R radical. Preferably, at least one X is sulfur.

Phosphinothioic acids useful in the improved process of this invention include ditolylphosphinodithioic acid,
bis(dichlorophenyl)phosphinodithioic acid,
di(octylphenyl)phosphinodithioic acid,
di(pentylphenyl)phosphinomonothioic acid,
di(octylnaphthyl)phosphinodithioic acid,
chlorophenyl isopropylphenylphosphinomonothioic acid,
di(isopropylphenyl)phosphinodithioic acid,
di(ethylphenyl)phosphinodithioic acid,
ditolylphosphinodithioic acid,
diphenylphosphinodithioic acid,
di(phenylthiophenyl)phosphinodithioic acid,
di(chlorophenyl)phosphinodithioic acid,
dihexylphosphinodithioic acid,
dioctadecylphosphinodithioic acid,
dinaphthylphosphinodithioic acid,
dibehenylphosphinodithioic acid, and
dicyclohexylphosphinodithioic acid.

Suitable phosphonothioic acids are exemplified by those corresponding to the above phosphinothioic acids wherein one of the hydrocarbon groups attached directly to the phosphorus is replaced by the corresponding hydrocarbon-oxy group or an —XH radical.

Mixtures of phosphorus acids are likewise useful in the process of this invention. They include the acids obtained by the reaction of a phosphorus sulfide such as phosphorus pentasulfide, phosphorus sesquisulfide, or phosphorus heptasulfide with a hydrocarbon such as an olefin, olefin polymer, or liquid petroleum fraction. The product of such reaction is usually a complex mixture containing predominantly phosphinothioic acids and phosphonothioic acids. The reaction by which such product is obtained is usually carried out at temperatures ranging from about 100° C. to 300° C. or higher and involves mixing the hydrocarbon reactant with from about 0.5% to about 15% (by weight) of a phosphorus sulfide. The reaction is well-known in the art and conditions for it likewise are well-known and need not be described in further detail here. The hydrocarbon reactants useful in such reactions may be liquid petroleum fractions having a boiling point of up to 600° F., olefins having from about 4 to 30 carbon atoms, and olefin polymers such as polybutenes and polypropylenes having molecular weights ranging from about 150 to about 100,000. Illustrative processes are disclosed in U.S. Patents 2,843,579, 2,962,493, 3,108,960, and 3,135,729.

The foregoing phosphorus acids are converted to their corresponding metal salts by treatment with a basic metal compound such as the oxide, hydroxide, hydride, carbonate, bicarbonate, sulfide, methoxide, ethoxide or phenoxide of the metal such as lithium, potassium, sodium, aluminum, barium, calcium, strontium, magnesium, zinc, iron, cobalt, nickel, copper, or cadmium. The most frequently used basic metal compounds are the oxides, carbonates, and hydroxides of zinc, barium, calcium, and cadmium. The improved process of the invention is especially useful in preparing zinc salts.

As indicated previously, the improved process of this invention involves carrying out the reaction of a phosphorus acid and a metal base in the presence of a catalyst. The catalyst is a carboxylic acid having up to about 10 aliphatic carbon atoms or a metal salt thereof. The acid may contain up to about 3 carboxylic radicals. Specific examples of these catalysts include formic acid, acetic acid, propionic acid, butyric acid, benzoic acid, trimellitic acid, o-phthalic acid, succinic acid, maleic anhydride, 1,3-cyclohexanedioic acid, decylbenzoic acid, toluic acid, valeric acid, caproic acid, sebacic acid, 2-heptanoic acid, itaconic acid, caprylic acid, 4-nonanoic acid, 3-decanoic acid, phenylacetic acid, naphthoic acid, 9-phenylstearic acid, dibutylbenzoic acid, and the salts thereof of a metal indicated above. Where a metal carboxylate is used as the catalyst, it is preferably the carboxylate of the same metal that is present in the metal salt of phosphorus acid produced by the process of this invention. Metal carboxylates useful as the catalyst are, for example, zinc acetate, calcium formate, barium butanoate, cobalt propionate, ferrous acetate, magnesium octanoate, cadmium naphthoate, cuprous acetate, nickel acetate, nickel phthalate, sodium acetate, potassium decanoate, lithium acetate, sodium benzoate, aluminum propionate, etc.

The alkanoic acids of up to 10 carbons and the above-indicated metal salts thereof comprise a preferred class of catalysts. Because of their effectiveness and for economic reasons acetic acid and salts thereof are particularly useful as catalysts.

A small amount of catalyst is effective to bring about the desired results of the process of this invention. Thus, the catalyst may be present in the reaction mixture at a concentration ranging from about 0.001 to about 0.2 equivalent per equivalent of the phosphorus acid in the reaction mixture. The preferred concentration of the catalyst is from about 0.01 to 0.1 equivalent per equivalent of the phosphorus acid.

The catalyst is effective to promote a more complete utilization of the reactants in the process of this invention and it results also in a higher yield of the desired product. Another advantage of the process of this invention is that the product so obtained has improved qualities as additives for use in lubricants. The effectiveness of the catalyst in these regards is especially noteworthy in the preparation of basic metal salts of phosphorus acids by reacting a phosphorus acid with a stoichiometrically excess amount (e.g., at least 1 and up to about 2 equivalents per equivalent of the acid) of the metal base.

The term "basic metal salts" is used herein to describe salts wherein the metal is present in stoichiometrically greater amounts than the phosphorus acid radical. For instance, a "normal" or "neutral" zinc salt has two equivalents (i.e., one mole) of zinc per two equivalents (i.e., 2 moles) of a phosphinic or phosphonic acid, whereas a "basic" zinc salt has more than two equivalents of zinc per two equivalents of the phosphorus acid.

The process of this invention, except for the use of the catalyst, can be carried out under conditions which are known to be suitable for the reaction of a phosphorus acid and a metal base. Such conditions usually include a temperature of from about 25° C. to the decomposition point of the reaction mixture. The preferred reaction temperature is within the range from about 50° C. to about 200° C. The reaction can be effected simply by mixing the phosphorus acid and the metal base; it may be carried out in the presence of a diluent or solvent which facilitates the control of the reaction temperature and the mixing of the reactants. Solvents useful for this purpose are illustrated by benzene, toluene, xylene, naphtha, chlorobenzene, dioxane, nitrobenzene, hexane and mineral oil.

A particularly convenient method of carrying out the process of this invention involves adding the metal base in small increments to a mixture of the phosphorus acid and the catalyst in a solvent. Another method involves adding the phosphorus acid to a mixture of the metal base and the catalyst. Still another method involves preparing a slurry of the metal base in a diluent and mixing the slurry with the phosphorus acid and the catalyst. Where the catalyst is a metal carboxylate, it may be formed in situ in the reaction mixture from the corresponding carboxylic acid and the metal base present in the reaction mixture.

The formation of the metal salt by the process of this invention is usually accompanied by the formation of by-products such as water. In most instances the by-products are separated from the metal salt by distillation, filtration, evaporation, precipitation or any such well-known means.

The process of this invention is useful also for the formation of metal salts of a mixture of the above-described phosphorus acids or mixtures of one or more of the above-described acids and one or more other phosphorus acids such as phosphorothioic acids (e.g., dibutyl phosphorodithioic acid, diisooctylphosphorodithioic acid, diphenylphosphorodithioic acid) and up to about two equivalents, per equivalent of phosphorus acid, of a hydrocarbon-substituted succinic acid having at least about 50 aliphatic carbon atoms in the hydrocarbon substituent. The mixture, in many instances, consists of the two acids in ratios of equivalents ranging from 0.1:1 to about 2:1. The sources of the hydrocarbon substituent in the succinic acid include principally the high molecular weight substantially saturated petroleum fractions and substantially saturated olefin polymers, particularly polymers of monoolefins having from 2 to 30 carbon atoms. The especially useful polymers are the polymers of 1-monoolefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-pentene, and 4-octene.

Also useful are the interpolymers of the olefins such as those illustrated above with other interpolymerizable olefinic substances such as aromatic olefins, cyclic olefins, and poly-olefins. Such interpolymers include, for example, those prepared by polymerizing isobutene with styrene; isobutene with butadiene; propene isoprene; ethylene with piperylene; isobutene with chloroprene; isobutene with p-methyl styrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene; etc.

The relative proportions of the mono-olefins to the other monomers in the interpolymers influence the stability and oil-solubility of the final products derived from such interpolymers. Thus, for reasons of oil-solubility and stability the interpolymers contemplated for use in this invention should be substantially aliphatic and substantially saturated, i.e., they should contain at least about 80%, preferably at least about 95%, on a weight basis, of units derived from the aliphatic mono-olefins and no more than about 5% of olefinic linkages based on the total number of carbon-to-carbon covalent linkages. In most instances, the percentage of olefinic linkages should be less than 2% of the total number of carbon-to-carbon covalent linkages.

Specific examples of such interpolymers include the copolymer of 95% (by weight) of isobutene with 5% of styrene; the terpolymer of 98% of isobutene with 1% of piperylene and 1% of chloroprene; the terpolymer of 95% of isobutene with 2% of 1-butene and 3% of 1-hexene; the terpolymer of 80% of isobutene with 10% of 1-pentene and 10% of 1-octene; the copolymer of 80% of 1-hexene and 20% of 1-heptene; the terpolymer of 90% of isobutene with 2% of cyclohexene and 8% of propene; and the copolymer of 80% of ethylene and 20% of propene.

Another source of hydrocarbon radicals comprises saturated aliphatic hydrocarbons such as highly refined high molecular weight white oils or synthetic alkanes such as are obtained by hydrogenation of high molecular weight olefin polymers illustrated above or high molecular weight olefinic substances.

The use of olefin polymers having molecular weights of about 750–5000 is preferred. Higher molecular weight olefin polymers having molecular weights from about 10,000 to about 100,000 or higher have been found to impart viscosity index improving properties to the final products of this invention. The use of such higher molecular weight olefin polymers often is desirable. It will be noted that the hydrocarbon substituent in the succinic acid likewise may contain inert polar groups. Thus, in this respect, it may be a radical which is substantially hydrocarbon in character, i.e., the polar groups are not present in proportion sufficiently large to alter the hydrocarbon character of the hydrocarbon substituent. The polar groups are exemplified by chloro, bromo, keto, ether, aldehyde, nitro, etc. The upper limit with respect to the proportion of such polar groups in a hydrocarbon substituent is usually about 10% based on the weight of the hydrocarbon portion of the substituent.

The succinic acids are readily available from the reaction of maleic anhydride with a high molecular weight olefin or a chlorinated hydrocarbon such as the olefin polymer described hereinabove. The reaction involves merely heating the two reactants at a temperature about 100°–200° C. The product from such a reaction is a succinic anhydride having a large hydrocarbon substituent. The succinic substituent may contain olefinic linkages which may be converted, if desired, to saturated paraffinic linkages by hydrogenation. The anhydride may be hydrolyzed by treatment with water or steam to the corresponding acid. It will be noted in this regard that the anhydride is equivalent to the acid insofar as its utility in the preparation of the product of A is concerned. In fact, the anhydride is often more reactive than the acid and is often preferred.

In lieu of the olefins or chlorinated hydrocarbons, other hydrocarbons containing an activating polar substituent, i.e., a substituent which is capable of activating the hydrocarbon molecule in respect to reaction with maleic acid or anhydride, may be used in the above-illustrated reaction for preparing the succinic acid. Such polar substituents may be illustrated by sulfide, disulfide, nitro, mercaptan, bromine, ketone, or aldehyde radicals. Examples of such polar-substituted hydrocarbons include polypropene sulfide, di-polyisobutene disulfide, nitrated mineral oil, di-polyethylene sulfide, brominated polyethylene, etc. Another method useful for preparing the succinic acids and anhydrides involves the reaction of itaconic acid with a high molecular weight olefin or a polar-substituted hydrocarbon at a temperature usually within the range from about 100° C. to about 200° C.

Where the relative amounts of the reactants of the process of this invention are described in terms of chemical equivalents, the equivalent weight of a reactant is based on the number of the functional groups present within its molecular structure. Thus, the equivalent weight of a phosphorus acid is based on the number of phosphorous acid radicals present in the molecule. A dialkylphosphinomonothioic or dithioic acid, for instance has one equivalent per mole. The equivalent weight of a substituted succinic acid having one succinic group per molecule has two equivalents per mole. The equivalent weight of a Group II metal base is one-half its molecular weight and the equivalent weight of a Group II metal carboxylate is likewise one-half its molecular weight. The equivalent weight of the carboxylic acid useful as the catalyst herein depends on the number of the carboxylic acid radicals present in the molecule. To illustrate, p-phthalic acid (or phthalic anhydride) has two equivalents per molecule, maleic acid (or maleic anhydride) has two equivalents per molecule, trimellitic anhydride has three equivalents per molecule and acetic acid has one equivalent per molecule.

The following examples illustrate the process of this invention:

EXAMPLE 1

A 45.5% toluene solution (695 grams) containing one equivalent of di(iso-propylphenyl)phosphinodithioic acid is added to a mixture of 114 grams of toluene, 61 grams (1.5 equivalents) of zinc oxide, and 5.5 grams (0.05 equivalent) of zinc acetate dihydrate while the reaction mixture temperature is maintained at 70° C. The reaction mixture is heated at 70° C. for one hour, heated to 40° C./10 mm. to distill off 300 grams of toluene and 7 grams of water, diluted with toluene and filtered. The filtrate (588 grams) has a zinc content of 4.56%, a phosphorus content of 3.65%, a sulfur content of 7.06%, and a Zn:P weight ratio of 1.25. Another experiment, similar to the above except that no zinc acetate is used, results in a product having a zinc content of 3.16%, a phosphorus content of 3.74%, a sulfur content of 7.26%, and a Zn:P weight ratio of 0.845.

EXAMPLE 2

To 939 grams (1.13 equivalent) of a polyisobutene (molecular weight of 1000)-substituted succinic anhydride (having an acid number of 100 and prepared by chlorinating the polyisobutene, reacting the chlorinated polyisobutene with a 20% molar excess of maleic anhydride), there is added 310 grams of mineral oil and 3.2 cc. of acetic acid. The mixture is heated to 88° C. and mixed with 119 grams (2.93 equivalents) of zinc oxide. The mixture is heated at 88°–110° C. for two hours whereupon 820 grams (1.1 equivalent) of di(chlorophenyl)phosphinodithioic acid is added to it at this temperature. The resulting mixture is then heated at 100°–110° C. and then at 150° C./20 mm. The residue is filtered. The filtrate (obtained in 94% of the theoretical yield) is found to have a phosphorus content of 1.97% and a zinc content of 5.4%. Another experiment siimlar to the above except that no acetic acid is used in the process results in a product (obtained in 95.9% of the theoretical yield) having a phosphorus content of 1.57% and a zinc content of 4.74%.

The effect of the acetic acid catalyst in increasing the utilization of both the phosphinic acid and zinc oxide is shown in the following table which reflects the results of seven preparations conducted under substantially identical conditions using the same reactants but with variations in the ratio of reactants and the presence or absence of acetic acid.

| Ratio of equivalents of reactants SA[1]/ZnO/PA[2] | Amount of acetic acid present (percent by weight based on theoretical yield of product) | Percent by weight of phosphorus and zinc in the reaction product | | | |
|---|---|---|---|---|---|
| | | Percent P | | Percent Zn | |
| | | Theory | Found | Theory | Found |
| 1.0/2.7/0.9 | 0.0 | 1.87 | 1.57 | 6.07 | 4.74 |
| 1.0/3.6/0.9 | 0.0 | 1.83 | 1.80 | 7.67 | 5.10 |
| 1.0/4.5/0.9 | 0.0 | 1.78 | 1.80 | 9.40 | 5.10 |
| 1.0/5.4/0.9 | 0.0 | 1.71 | 1.80 | 12.19 | 5.30 |
| 1.0/2.4/0.9 | 0.1 | 1.90 | 1.66 | 5.30 | 4.80 |
| 1.0/2.4/0.9 | 0.2 | 1.90 | 1.90 | 5.30 | 5.30 |
| 1.0/2.4/0.9 | 0.3 | 1.90 | 1.93 | 5.30 | 5.25 |

[1] SA=Polyisobutenyl-substituted succinic anhydride.
[2] PA=Phosphinic acid.

EXAMPLE 3

(a) A di(alkylphenyl)phosphinothioic acid is prepared by reacting 3776 grams of a commercial mixture of alkylbenzenes having an average molecular weight of about 236, 622 grams of $P_2S_5$, and 995 grams of $AlCl_3$ in a twelve-liter flask equipped with stirrer nitrate inlet tube, and reflux condenser. The mixture is heated to a temperature within the range of 105–110° C. for three hours while blowing the reaction mass with nitrogen. Thereafter, the reaction mass is cooled to 60–70° C. and added to 8 liters of water at room temperature over a twenty-minute period. An exothermic reaction results and the temperature increases to 65° C. This mixture is subsequently heated to 75° C. over a one-half hour period. The water layer is siphoned off and the organic layer again added to 8 liters of water. The water-organic layer mixture is thoroughly agitated while heating to 75° C. Thereafter, the water is siphoned off and the organic layer is thoroughly mixed with 76 grams of attapulgur clay and filter. The filtrate is 3556 grams of a red-brown liquid which is the desired acid mixture containing 3.8% by weight phosphorus and 7.01% by weight sulfur.

(b) To a mixture of 1064 grams of mineral oil and 151 grams of zinc oxide (3.7 equivalents) maintained at 60° C. in a twelve-liter flask fitted with a stirrer and reflux condenser, there is added 55 grams of a 40% aqueous solution of acetic acid (0.37 equivalent). The resulting mixture is heated to 90° C. and maintained at 90–100° C. for a period of one and one-half hours during which 3016 grams (3.7 equivalents) of the acid of (a) is added. Thereafter, 75 grams (1.85 equivalents) of zinc oxide is added and this mixture is maintained at 95–100° C. for one hour. The resulting product is stripped to a temperature of 150° C. at a pressure of 100 millimeters of mercury over a one and one-half hour period and then filtered. The filtrate (3,343 grams) is a reddish-brown oil solution of the desired zinc salt analyzing as follows: 2.68% by weight P; 5.54% by weight S; and 4.24% by weight Zn.

EXAMPLE 4

The procedure of Example 3(b) is repeated with the substitution of an equivalent amount of a phosphonic acid containing reaction product for the phosphinothioic acid. This product is produced by reacting phosphorus pentasulfide and polybutylene (average M.W. of 780) in a mole ratio of 1:1.25 in the presence of 0.5% by weight sulfur based on the weight of polybutylene. The reaction mixture is heated at 230° C. in a nitrogen atmosphere for about four hours after which the reaction product is diluted with about 1.7 times the weight of the polybutylene of a mineral oil characterized by a SUS viscosity of 100 at 100° F. This diluted mixture is steam-blown at 190° C. for four hours in a nitrogen atmosphere. The steamed product is treated with synthetic hydrous calcium silicate at 150° C. for three hours and filtered. The product is a clear oil solution of the desired phosphorus acids.

EXAMPLE 5

The procedure of Example 1 is repeated except that an equivalent amount of zinc dioctanoate is substituted for the zinc acetate.

While the above examples illustrate the preferred embodiments of the present improved process, that is, the preparation of zinc salts using zinc alkanoate or alkanoic acids as catalyst, it is apparent that by following the indicated procedures, other embodiments of the process can be practiced. Thus, the zinc oxide can be replaced with barium, calcium, or cadium oxide, hydroxide, or carbonate. Similarly, propionic acid, butyric acid, benzoic acid, their metal salts, and the like may be substituted for the acetic and octanoic acids and salts of the examples.

The metal salts of this invention are useful as additives in lubricating oils, gasolines, and fuel oils in the same manner as phosphorus acid metal salts of the prior art. Particularly useful applications of the metal salts are as extreme pressure agents, detergents, and rust and oxidation inhibiting agents in lubricants. They are also useful as insecticides, pesticides, ore-floatation agents, plasticizers, etc. When used in such applications, the metal salts are capable of imparting oxidation resistance and anticorrosiveness to the compositions in which they are present.

The concentration of the metal salts of this invention in a lubricating composition depends primarily upon the type of oil used and the nature of the service to which the lubricating composition is to be subjected. In most instances, the concentration will range from about 0.001% to about 5% by weight of the final lubricant. The concentration of the metal salts in a fuel oil or gasoline usually is within the range of from about 0.0001% to about 1% by weight.

The metal salts of this invention are unique in that they are especially resistant to deterioration when they are subjected to high temperature and prolonged contact with air. This superior stability is an important quality, especially from the standpoint of the utility of the metal salts as additives in lubricants, fuel oils, and gasolines. The reason for such stability is not understood, but it is known that the stability is directly related to the presence of the catalyst in the reaction mixture from which the metal salt is prepared.

The lubricating oils in which the salts of this invention are useful may be of synthetic, animal, vegetable or mineral origin. Ordinarily, mineral lubricating oils are preferred by reason of their availability, general excellence, and low cost. For certain applications, oils belonging to one of the other three groups may be preferred. For instance, synthetic polyester oils such as didodecyl adipate and di-2-ethylhexyl sebacate are often preferred as jet engine lubricants. Normally, the lubricating oils preferred will be fluid oils ranging in viscosity from about 40 SUS (Saybolt Universal Seconds) at 100° F. to about 200 SUS at 210° F.

The lubricating compositions containing the metal salts of this invention may contain also other additives such as, for example, detergents of the ash type, detergents of the nonash type, viscosity index improving agents, pour point depressing agents, antifoam agents, and auxiliary extreme pressure agents, rust-inhibiting agents, and oxidation and corrosion inhibiting agents.

Ash-containing detergents are exemplified by the oil-soluble neutral and basic salts of alkali or alkaline earth metals with sulfonic acids, carboxylic acids containing at least 12 aliphatic carbon atoms, or organic phosphorus acids characterized by at least one direct carbon-to-phosphorus linkage such as those prepared by the treatment of an olefin polymer (e.g., one having a molecular weight of 700–100,000) with a phosphorizing agent such as phosphorus trichloride, phosphorus heptasulfide, phosphorus pentasulfide, phosphorus trichloride and sulfur, white phosphorus and a sulfur halide, or a phosphorothioic chloride. The most commonly used salts of such acids are those of sodium, potassium, lithium, calcium, strontium, and barium. Basic salts, i.e., those in which the metal is present in stoichiometrically larger amounts than the organic acid radical, are especially useful. The commonly employed methods for preparing the basic salts involve heating a mineral oil solution of an organic acid with a stoichiometric excess of a metal base such as a metal oxide, hydroxide, carbonate, bicarbonate, or sulfide at a temperature of around 50° C. and filtering the resulting mass. The use of a promoter, e.g., a phenol or alcohol, in the neutralization step to aid the incorporation of a large excess of metal is likewise known. A particularly effective method for preparing the basic salts comprises mixing an acid with an excess of a basic alkaline earth metal neutralizing agent, a phenolic promoter compound, and a small amount of water and then carbonating the mixture at an elevated temperature, e.g., 60°–200° C.

Detergents of a non-ash type include acylated alkylene polyamines such as tetraethylene pentamine obtained by reacting the amine with an alkenyl- or alkyl-substituted succinic anhydride or acid having at least 50 carbon atoms in the alkenyl or alkyl substituent; the reaction product of boric acid with the previously described acylated amine; and the copolymer of 5 parts of betadiethylamino-ethyl acrylate with 95 parts of dodecyl methacrylate, etc.

Antifoam agents include polymeric alkyl siloxanes, poly(alkyl methacrylates) and the condensation product of an alkyl phenol with formaldehyde and an amine. Pour point depressing agents are illustrated by polymers of ethylene, propylene, or isobutene and poly(alkyl methacrylates). Corrosion- and oxidation-inhibiting agents include hindered phenols such as 4-methyl-2,6-di-tert-butylphenol, N,N'-sec-butyl phenylene diamine, basic metal petroleum sulfates, metal phenates, amines, benzyl thiocyanates, etc. Film strength agents include, e.g., chlorinated petroleum oils containing from 20 to 70% of chlorine, chlorinated eicosane wax containing from 50 to 60% of chlorine, hexachloro-diphenyl ether, polychlorophenyl, polychloro-bi-phenyl, etc. Oiliness agents include, e.g., methyl oleate, oleic acid, stearic acid, sulfurized sperm oil, sperm oil, corn oil, etc. Viscosity index improvers include, e.g., polymerized and copolymerized alkyl methacrylates, and polybutene.

The lubricating compositions may be prepared by adding one or more of the metal salts of this invention, alone or with other additives, to a lubricating oil. In many instances, it is advantageous to prepare concentrates of the salts of this invention with other additives and to later add the concentrate to lubricating oil. The following lubricants are illustrative. (All parts are by weight.)

Example A

| | Parts |
|---|---|
| SAE 30 mineral lubricating oil | 93.79 |
| Product of Example 1 | 1.00 |
| Tetraethylene pentamine acylated with an equivalent amount of polyisobutenyl (average molecular weight=850)-substituted succinic acid | 5.21 |
| Polymeric alkyl siloxane antifoam agent | 0.003 |

Example B

| | |
|---|---|
| SAE 10W-30 mineral lubricating oil | 87.41 |
| Product of Example 2 | 2.317 |
| Polymeric, viscosity index improving agent (interpolymer of N-vinyl-2-pyrrolidone (10% by weight), butyl methacrylate (5%), and a mixture of $C_{12-15}$ alkyl methacrylate (85%) having a molecular weight of 50,000) | 5.1 |
| Tetraethylene pentamine acylated with 0.5 equivalent of the substituted succinic acid described in Example A (70% by volume); tetraethylene pentamine acylated with 1.5 equivalents of the same substituted succinic acid (15% by volume); and tetraethylene pentamine acylated with one equivalent of the same substituted succinic acid (15% by volume) | 2.67 |
| Carbonated, basic calcium petroleum sulfonate having a sulfate ash content of 40% | 2.50 |
| Polymeric alkyl siloxane antifoam agent | 0.003 |

What is claimed is:

1. In the process for preparing metal salts of phosphorus acids comprising the reaction of a Group II metal base with a phosphorus acid corresponding to the formula

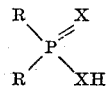

wherein one R is selected from the class consisting of hydrocarbon, and hydrocarbon-oxy, and XH radicals and the other R is a hydrocarbon radical and X is oxygen or sulfur, the improvement comprising carrying out the process in the presence of a catalyst selected from the class consisting of carboxylic acids having up to about 10 aliphatic carbon atoms and salts thereof with a metal selected from the class consisting of Group I metals, Group II metals, aluminum, iron, nickel, cobalt, and copper.

2. The process of claim 1 wherein the Group II metal base is zinc oxide.

3. The process of claim 1 wherein the phosphorus acid is a phosphinodithioic acid.

4. The process of claim 1 wherein the catalyst is acetic acid.

5. In the process for preparing metal salts of phosphorus acids according to claim 1 comprising the reaction of from about 1 to 2 equivalents of a Group II metal base with 1 equivalent of a dialkylphosphinodithioic acid, the improvement comprising carrying out the process in the presence of a catalytic amount of a carboxylic acid having up to about 10 aliphatic carbon atoms.

6. The process of claim 5 wherein the Group II metal base is zinc oxide.

7. The process of claim 5 wherein the carboxylic acid is acetic acid.

8. In the process for preparing metal salts of phosphorus acids according to claim 1 comprising the reaction of from about 1 to 2 equivalents of a Group II metal base with 1 equivalent of a dialkarylphosphinodithioic acid, the improvement comprising carrying out the process in the presence of a catalytic amount of a carboxylic acid having up to about 10 aliphatic carbon atoms.

9. The process of claim 8 wherein the Group II metal base is zinc oxide.

10. The process of claim 8 wherein the carboxylic acid is acetic acid.

11. In the process for preparing metal salts of a mixture of a phosphorus acid and a hydrocarbon-substituted succinic acid comprising the reaction of a Group II metal base with a mixture of (1) organic phosphorus acids corresponding to the formula

wherein R is selected from the class consisting of hydrocarbon and hydrocarbon-oxy radicals, and X is oxygen or sulfur, at least one of the acids comprising the mixture being other than a phosphorodithioic acid, and (2) a hydrocarbon-substituted succinic acid or anhydride having at least about 50 aliphatic carbon atoms in the substituent, the improvement comprising carrying out the process in the presence of a catalyst selected from the class consisting of carboxylic acids having up to about 10 aliphatic carbon atoms and salts thereof with a metal selected from the class consisting of Group I metals, Group II metals, aluminum, iron, nickel, cobalt, and copper.

12. In the process for preparing metal salts of a mixture of a phosphorus acid and a substituted succinic acid comprising the reaction of from about 1 to 2 equivalents of a Group II metal base with 1 equivalent of a mixture of (1) diarylphosphinodithioic acid and (2) a hydrocarbon-substituted succinic acid having at least about 50 aliphatic carbon atoms in the substituent, the improvement comprising carrying out the process in the presence of a catalytic amount of a carboxylic acid having up to about 10 aliphatic carbon atoms.

13. The process of claim 12 wherein the diarylphosphinodithioic acid is di(chlorophenyl)phosphinodithioic acid.

14. In the process for preparing zinc salts of a mixture of di(chlorophenyl)phosphinodithioic acid and a substituted succinic acid according to claim 12 comprising the reaction of from about 1 to 2 equivalents of zinc oxide with 1 equivalent of a mixture of di(chlorophenyl)phosphinodithioic acid and a polyisobutene-substituted succinic anhydride wherein the polyisobutene substituent has a molecular weight of about 1000, the improvement comprising carrying out the process in the presence of a catalytic amount of acetic acid.

15. A metal salt of a phosphorus acid produced by the process comprising reacting a Group II metal base with a phosphorus acid corresponding to the formula

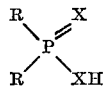

wherein one R is selected from the class consisting of hydrocarbon, hydrocarbon-oxy, and XH radicals and the other R is a hydrocarbon radical and X is selected from the class consisting of oxygen and sulfur in the presence of a catalyst selected from the class consisting of carboxylic acids having up to about 10 aliphatic carbon atoms and Group II metal salts thereof.

16. A zinc salt according to claim 15 prepared by the process comprising reacting zinc oxide with said phosphorus acid where the X variables are sulfur in the presence of a catalytic amount of acetic acid.

17. A zinc salt according to claim 15 prepared by the process comprising reacting from about 1 to 2 equivalents of zinc oxide with 1 equivalent of a diarylphosphinodithioic acid in the presence of a catalytic amount of a carboxylic acid having up to about 10 aliphatic carbon atoms.

18. A zinc salt according to claim 15 prepared by the process comprising reacting zinc oxide with di(chlorophenyl)phosphinodithioic acid in the presence of a catalytic amount of acetic acid.

References Cited
UNITED STATES PATENTS

| | | | |
|---|---|---|---|
| 2,346,155 | 4/1944 | Denison et al. | 260—429.9 XR |
| 2,274,302 | 2/1942 | Mulit | 260—429.9 XR |
| 2,797,238 | 6/1957 | Miller | 260—429.9 XR |
| 2,809,979 | 10/1957 | Craig | 260—429.9 |
| 3,004,996 | 10/1961 | Arakelian | 260—429.9 |
| 3,168,497 | 2/1965 | Twitchett | 260—429.9 XR |
| 3,238,248 | 3/1966 | Rauhut | 260—429.9 XR |
| 3,271,310 | 9/1966 | Le Suer | 260—429.9 XR |
| 3,290,347 | 12/1966 | Miller | 260—429.9 |
| 3,293,208 | 12/1966 | Milionis | 260—429.9 XR |
| 3,300,409 | 1/1967 | Butler | 260—429.9 XR |

TOBIAS E. LEVOW, *Primary Examiner.*

H. M. S. SNEED, *Assistant Examiner.*